United States Patent [19]
Sugita

[11] Patent Number: 5,835,488
[45] Date of Patent: Nov. 10, 1998

[54] PSEUDO RANDOM NOISE SEQUENCE CODE GENERATOR AND CDMA RADIO COMMUNICATION TERMINAL

[75] Inventor: Takehiro Sugita, Kanagawa, Japan

[73] Assignee: Sony Corporation, Tokyo, Japan

[21] Appl. No.: 645,584

[22] Filed: May 14, 1996

[30] Foreign Application Priority Data

May 24, 1995 [JP] Japan ..................................... 7-151027

[51] Int. Cl.⁶ ............................. H04B 7/216; H04B 1/69; H04J 13/02; H04J 13/04
[52] U.S. Cl. ......................... 370/335; 375/200; 375/206; 341/173; 370/320; 370/342; 370/441; 370/479; 370/311
[58] Field of Search ..................................... 375/200, 206; 341/173, 187; 380/33, 44, 47, 50; 365/80, 93, 189.12; 370/335, 320, 342, 441, 479, 311, 203; 342/45; 364/717.03

[56] References Cited

U.S. PATENT DOCUMENTS

| | | | |
|---|---|---|---|
| 5,606,322 | 2/1997 | Allen et al. ............................. | 341/173 |
| 5,623,485 | 4/1997 | Bi ............................................. | 370/209 |
| 5,631,922 | 5/1997 | Sekine et al. ........................... | 375/206 |
| 5,671,221 | 9/1997 | Yang ....................................... | 370/320 |

*Primary Examiner*—Wellington Chin
*Assistant Examiner*—Daniel Song
*Attorney, Agent, or Firm*—Jay H. Maioli

[57] ABSTRACT

A pseudo random noise sequence code generating circuit has a sequence generator (11) for sequentially generating a maximum length linear code sequence at an N-chip cycle and a first to (N−1)th vector multiplier (12 to 14) for obtaining values of skipped portions in the sequence generator by vector multiplication. It does so on the basis of the state value (S1) of a register forming the sequence generator, and generates a successive pseudo random noise sequence code based on an output of the sequence generator (PN1) and outputs of the first to the (N−1)th vector multiplier (PN2 to PN4). Thereby, the operating rate can be reduced to 1/N as compound to the prior art, and the operating voltage and electric power consumption can be reduced.

11 Claims, 9 Drawing Sheets

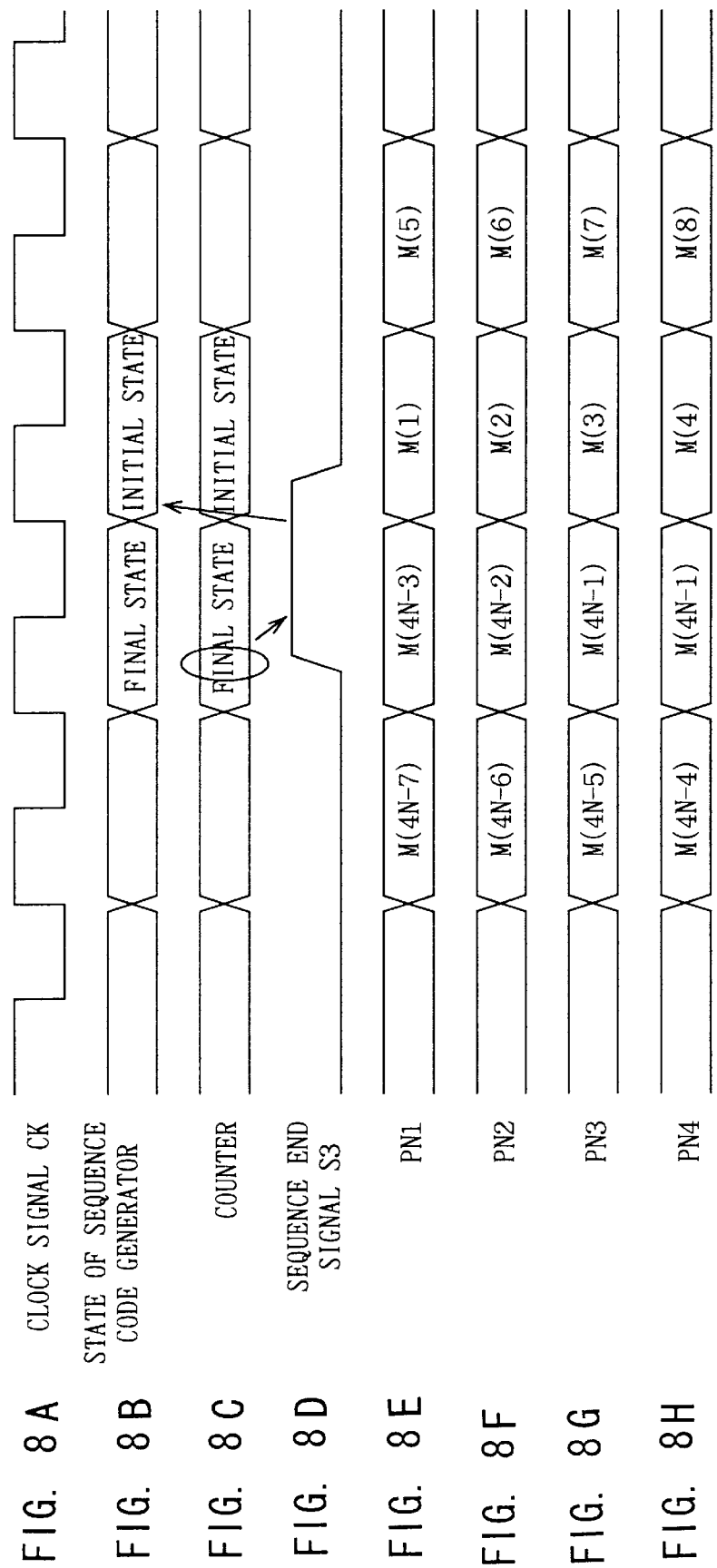

PSEUDO RANDOM NOISE SEQUENCE CODE GENERATOR AND CDMA RADIO COMMUNICATION TERMINAL

BACKGROUND OF THE INVENTION

1. Field of the Invention

The present invention relates to a pseudo random noise sequence code generating circuit and CDMA radio communication terminals, and is applicable, for instance, to a PN code generating circuit and communication terminals used in the cellular system of a code division multiple access (CDMA) method (hereinafter, referred to as CDMA cellular, for short).

2. Description of the Related Art

Heretofore, in the CDMA cellular, communication has been executed by the spread spectrum, and so the pseudo random noise sequence code (PN code) which is used in the spread spectrum has been generated by means of a PN generator shown in FIG. 1, for example. To simplify an explanation, the PN generator of the fourth degree is shown herein.

The PN generator 1 generates a maximum length linear shift resister sequence code (M sequence code) of fourth degree (with 15 cycles). One value in the M sequence code is output from the delay-type flip-flop (DFF) 5 of the final stage every time when a clock signal CK is input. Note that, an initializing signal $S_{INT}$ is input from external equipment to the PN generator 1 so that each delay-type flip-flop 2 to 5 is initialized; thereby, the whole PN generator 1 is initialized.

By the way, in the CDMA cellular, the rate of PN codes used in the spread spectrum (namely chip rate) is about 9.8 [MHz]. Therefore, on using the structure shown in FIG. 1, the PN generator must operate at the rate of 9.8 [MHz]. For that reason, the operating speed of the hardware cannot be reduced as terminal equipment; thus there is a problem in reducing electric power consumption.

To reduce the electric power consumption of hardware, generally, these are three possibilities reducing the circuit scale of a portion operating at high speed, reducing the operating voltage, and reducing the additional capacity of the circuits, etc. Among those, the method of reducing the operating voltage gives large effects particularly: it can reduce the electric power consumption in proportion to the square of the voltage.

In the spread spectrum communication such as the CDMA cellular, a high-speed PN code is further multiplied by a modulated information signal to extend the frequency bandwidth; as a result, the operating rate of the PN generator is extremely high. Therefore, in the spread spectrum communication, the operating rate of the hardware is higher than in the other methods and it is difficult to reduce the operating voltage; reducing electric power consumption becomes difficult comparing with the other methods.

However if the operating rate of the PN generator, having the largest operating rate in the hardware, can be reduced, the operation voltage will be reduced; as a result, the electric power consumption of the terminal apparatuses can be reduced.

SUMMARY OF THE INVENTION

In view of the foregoing, an object of the present invention is to provide a pseudo random noise sequence code generator capable of reducing the operating rate.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 8A to 8H are timing charts explaining the operation of the second embodiment of the PN generator;

DETAILED DESCRIPTION OF THE EMBODIMENT

Preferred embodiments of the present invention will be described with reference to the accompanying drawings:

(1) Summary

Generally, a PN generator used in the CDMA cellular is basically formed by a sequence generator for generating an M sequence code. In the embodiments, an M sequence code of each N chips is output for each clock by the sequence generator, and values for (N−1) chips which have been skipped in the sequence generator are generated from the state value of the register of the sequence generator by vector multiplication. Thereby, in the embodiments, the operating rate of the PN generator is reduced to 1/N to reduce the operating voltage of the circuit; as a result, the electric power consumption is reduced.

Further, the PN code used in the CDMA cellular is adjusted to have $2^{15}$ cycles by additionally inserting "0" to the end of the cycle of the fifteenth-degree M sequence code (concretely, after fourteen sequential "0"s). In a simple vector multiplication, the end portion of the cycle of the PN code cannot be generated; however, the embodiments can easily generate this portion with a simple structure by added a selecting circuit, a sequence generator with initializing input, and a control circuit controlling them.

(2) First Embodiment (2-1) General Configuration

Figure 1:
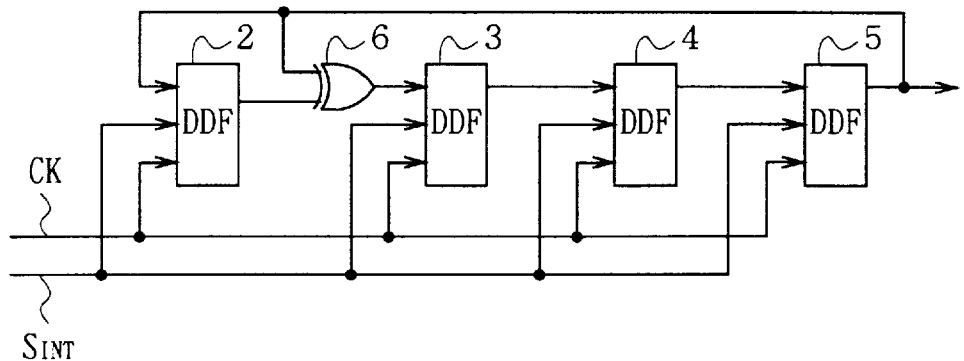
FIG. 1 is a block diagram showing the structure of a related PN generator.
Figure 2:
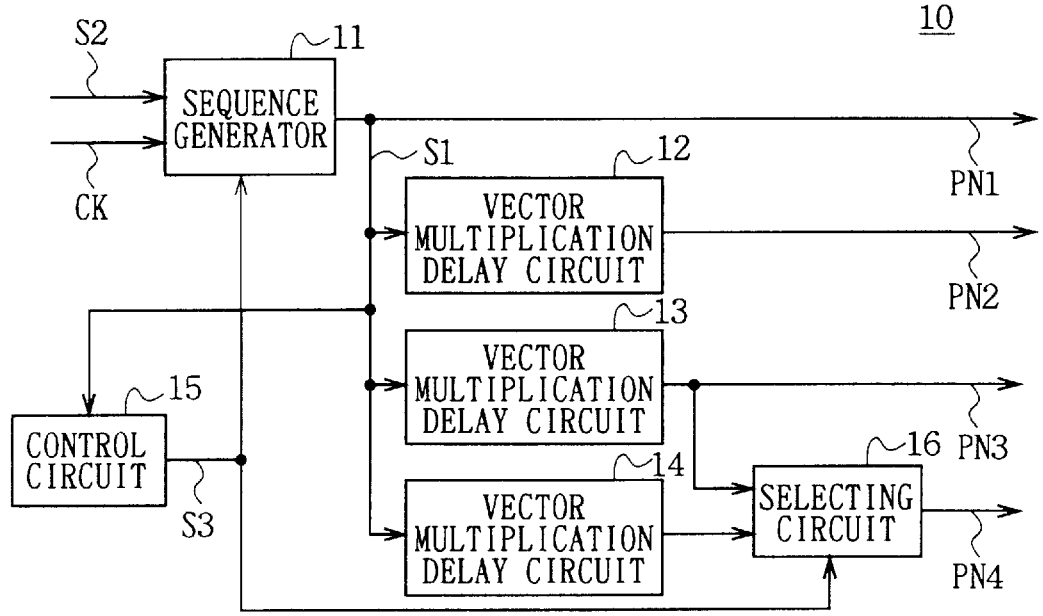
FIG. 2 is a block diagram showing the general configuration of the PN generator according to the first embodiment of the present invention.

In FIG. 2, reference numeral 10 generally shows a PN generator used in the CDMA cellular. The PN generator 10 generates a PN code at a quarter the operating rate typical of the prior art. In this case, the PN generator 10 generates a $2^{15}$ cycle sequence, which has an additional "0" inserted at the end of the fifteenth-degree M sequence code, as PN codes according to the system of the CDMA cellular.

A sequence generator 11 is a circuit for sequentially generating a fifteenth-degree M sequence code at four-chip cycle on the basis of the clock signal CK. The sequence generator 11 outputs the state value of the register of the final stage as a first PN output PN1 in state values S1 of each register, and also outputs the state values S1 of respective registers to vector multiplication delay circuits 12 to 14 and a control circuit 15.

This sequence generator 11 is initialized by an initializing signal S2 input from external equipment or a sequence end signal S3 output from the control circuit 15.

The vector multiplication delay circuits 12 to 14 are circuits for multiplying a state vector obtained from the state value S1 by a delay vector generated by an internal delay vector generator, to generate the skipped portion in the M sequence codes at the four-chip cycle which has been generated by the sequence generator 11. The vector multiplication delay circuit 12 obtains the value of a chip which is the next to the M sequence code generated by the sequence generator 11, and outputs the thus obtained value as a second PN output PN2. The vector multiplication delay circuit 13 obtains the value of a chip which is two chips behind the M sequence code generated by the sequence generator 11, and outputs the thus obtained value as a third PN output PN3.

Similarly, the vector multiplication delay circuit 14 obtains the value of a chip which is three chips behind the M sequence code generated by the sequence generator 11, and, outputs the thus obtained value to a selecting circuit 16 together with the third PN output PN3.

The selecting circuit 16 selects the third PN output PN3 in the final state of the cycle of the sequence generator 11 on the basis of the sequence end signal S3 output from the control circuit 15, or on the other hand, selects the value obtained by the vector multiplication delay circuit 14 in the other portions, and outputs the selected value as a fourth PN output PN4.

The third PN output PN3 is selected in the final state because the last "0" portion cannot be obtained simply by vector multiplication since the generated PN code has an additional "0" inserted a the end of the cycle of the fifteenth-degree M sequence code as described the above. However, since the last "0" portion is equal to the one before (that is, the third PN output PN3), in this embodiment, the third PN output PN3 is output as the fourth PN output PN4 to simplify the structure.

The control circuit 15 detects the final state from the periodically changing state of the sequence generator 11 by monitoring the state value S1 output from the sequence generator 11. When it detects the final state, the control circuit 15 outputs the sequence end signal S3 to the selecting circuit 16 to signify the final state, and also outputs the sequence end signal S3 to the sequence generator 11 to initialize the sequence generator 11. In this case, the sequence generator 11 is initialized in the final state because if initialization is not performed, the state of the sequence generator 11 is sequentially shifted causing an, inconvenience.

Figure 3:
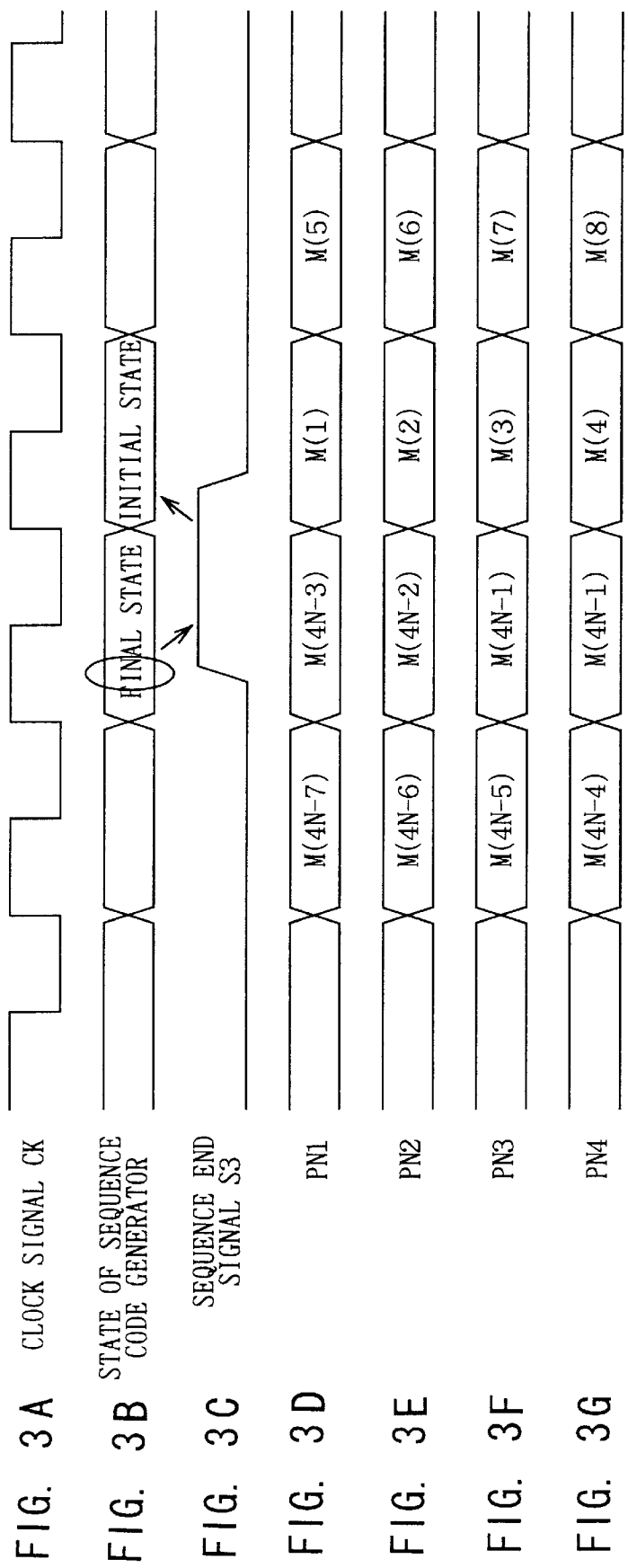
FIGS. 3A to 3G are timing charts explaining the operation of the PN generator.

The operation of the PN generator 10 will be described hereinafter with reference to the timing charts shown in FIGS. 3A to 3G. As shown in FIGS. 3A, 3B, and 3D, the sequence generator 11 generates M sequence codes [M(1), M(5), . . . ] at a four-chip cycle on the basis of the clock signal CK, and outputs them as the first PN output PN1. Then, if the control circuit 15 detects the final state as shown in FIGS. 3B and 3C, the sequence generator 11 is initialized and returned to the initial state, and sequentially generates M sequence codes [M(1), M(5), . . . ] again.

On the other hand, the vector multiplication delay circuits 12 to 14 output the values, delayed for one chip, delayed for two chips, and delayed for three chips from the first PN output PN1, respectively, by vector multiplication based on the state value S1output from the sequence generator 11. More specifically, as shown in FIG. 3E, the vector multiplication delay circuit 12 generates the values [M(2), M(6), . . . ] of the chip which is the next to the M sequence code generated by the sequence generator 11, and outputs them as the second PN output PN2. The vector multiplication delay circuit 13 generates the values [M(3), M(7), . . . ] of the chip which is two chips behind two the M sequence code generated by the sequence generator 11, and outputs them as the third PN output PN3, as shown in FIG. 3F. The vector multiplication delay circuit 14 generates the values [M(4), M(8), . . . ] of the chip which is three chips behind three the M sequence code generated at the sequence generator 11, and outputs them as the fourth PN output PN4, as shown in FIG. 3G.

However, in the final state, the value [M(4N−1)] of the third PN output PN3 has been output as the fourth PN output PN4. Because the generated PN code has an additional "0" inserted at the end of the cycle of the fifteenth-degree M sequence code and the sequence has $2^{15}$ cycle, the added portion cannot be easily obtained by vector multiplication. Therefore, in this embodiment, the output just before (namely the third PN output PN3) has been output as the fourth PN code PN4, so that the sequence generator can be accomplished with a simple construction.

By combining these generated first to fourth PN outputs PN1 to PN4 as the above, a successive PN code can be obtained. The successive PN codes can be obtained in the concrete, by switching the first PN output PN1 to the fourth PN output PN4 in the order, for instance, in accordance with the clock signal being four times the clock signal CK.

(2-2) Structure of Sequence Generator

The structure of the above-mentioned sequence generator 11 will be described with reference to FIG. 4. However, it is assumed that the sequence generator 11 generates a fourth-degree M sequence code to simplify the description.

Figure 4:
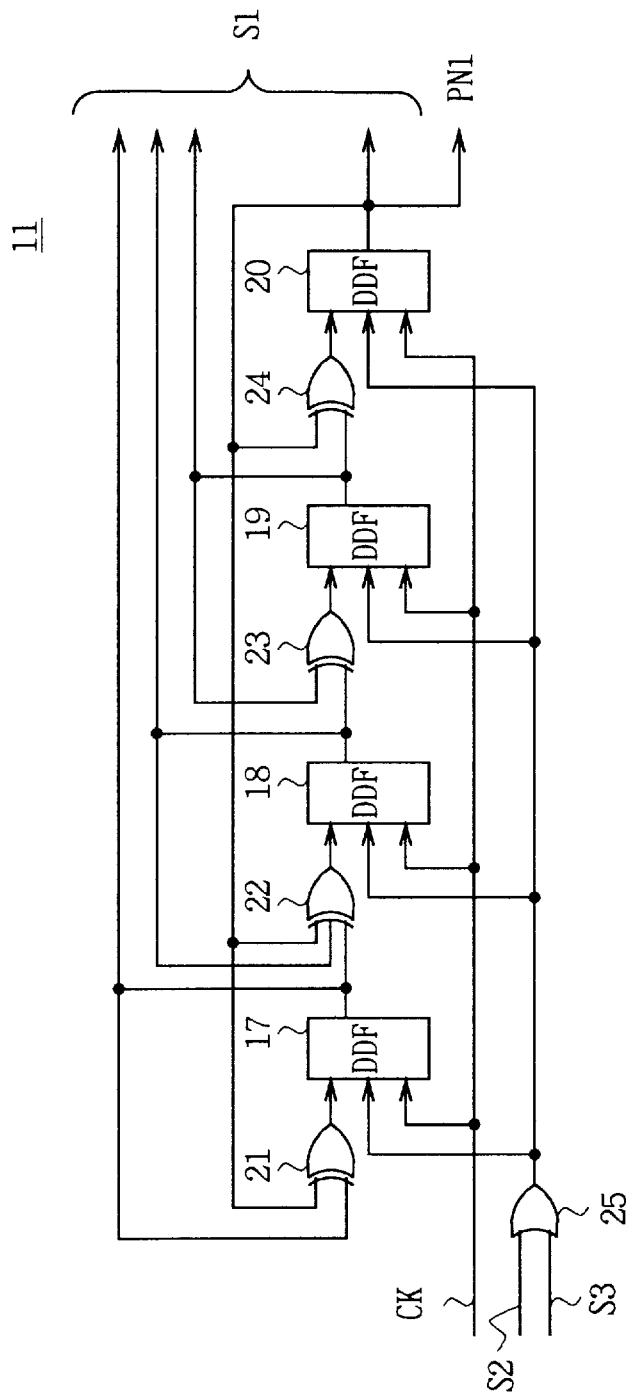
FIG. 4 is a block diagram showing the structure of the sequence generator in the case of the fourth degree.

In the case of the fourth degree, as shown in FIG. 4, the sequence generator 11 is composed of four delay-type flip-flops (DFF) 17 to 20 being registers and four exclusive OR gates 21 to 24. In the sequence generator 11, the state value of the delay-type flip-flop 20 at the final stage is output as the first PN output PN1, and the state values of respective delay-type flip-flops 17 to 20 are output to the vector multiplication delay circuits 12 to 14 and the control circuit 15 respectively, as the state value S1.

In this case, the succeeding change of each delay-type flip-flop 17 to 20 will determine which output of the delay-type flip-flops (17 to 20) is connected to the input side of the exclusive OR gates 21 to 24 provided on the input stage. In FIG. 4, the sequence generator 11 is so constituted that it generates a value for each four chips. In the case of changing the cycle from four chips to eight chips, however, it is good to change the output of the delay-type flip-flop (17 to 20) connected to the input side of the exclusive OR gates 21 to 24.

Note that, in this sequence generator 11, the clock signal CK is directly input to each delay-type flip-flop 17 to 20; each of the delay-type flip-flops 17 to 20 operates on the basis of the clock signal CK. On the other hand, in the sequence generator 11, the initializing signal S2 and the sequence end signal S3 are input via an OR gate 25 to the delay-type flip-flops 17 to 20 respectively. If the delay-type flip-flops 17 to 20 had received either the initializing signal S2 or the sequence end signal S3, it is initialized so that the whole sequence generator 11 is initialized.

(2-3) Structure of Control Circuit

Figure 5:
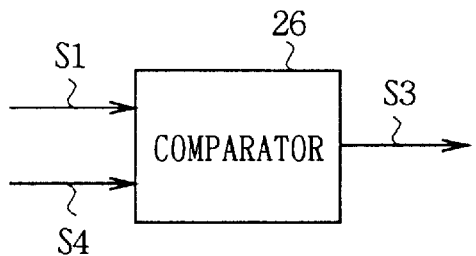
FIG. 5 is a block diagram showing the structure of the control circuit.

The control circuit 15 will be described with reference to FIG. 5. The control circuit 15 is formed by a comparator 26 as shown in FIG. 5. In the comparator 26, the state value S1 of each register in the above sequence generator 11 is input, and also the final state value S4 of each register in the sequence generator 11 is input as fixed values for comparison.

The comparator 26 detects the final state of the sequence generator 11 by checking whether the input state value S1 coincides with the final state value S4. As a result, if there is a coincidence of the state value S1 and the final state value S4, the comparator 26 outputs the sequence end signal S3. This sequence end signal S3 is output to the selecting circuit 16 for the purpose of balancing with the fourth PN output PN4, and also output to the sequence generator 11 for initialization.

(2-4) Structure of Vector Multiplication Delay Circuit

The vector multiplication delay circuits 12 to 14 will be described with respect to FIG. 6. However, since the vector multiplication delay circuits 12 to 14 have the same structure, only the vector multiplication delay circuit 12, is described corresponding to the case where the sequence generator 11 is the fourth degree (see FIG. 4).

Figure 6:
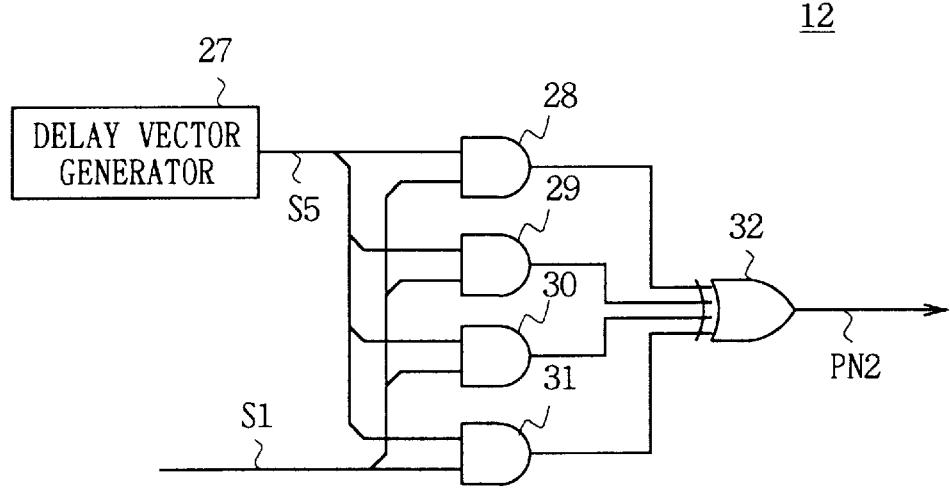
FIG. 6 is a block diagram showing the structure of the vector multiplication delay circuit in the case of the fourth degree.

The vector multiplication delay circuit 12 is composed of a delayed vector generator 27, AND gates 28 to 31, and an exclusive OR gate 32, as shown in FIG. 6.

The delayed vector generator 27 is a circuit for generating a delayed vector used when the portion between the M sequence codes generated at a four-chip cycle generated by the sequence generator 11 is obtained by vector multiplication, and outputs each component of thus generated delayed vector S5 to the AND gates 28 to 31 one by one.

In the AND gates 28 to 31, each component of the state value S1 output from the sequence generator 11 has been input as a vector, respectively.

Each of the AND gates 28 to 31 obtains as a conjunction of inputs each component of the delayed vector S5 and each input component of the state value S1, and outputs the thus obtained conjunction to the exclusive OR gate 32 respectively.

In the exclusive OR gate 32, the exclusive OR of the conjunctions output from the AND gates 28 to 31 is obtained, and the value which is delayed for one chip from the M sequence code generated by the sequence generator 11 (namely the second PN output PN2) is output.

Note that, in the case where the sequence generator 11 is the fourth degree, the state value S1 is composed of four components as shown in FIG. 4, and corresponding to that, the delayed vector S5 generated at the delayed vector generator 27 is also composed of four components. Accordingly, in the case where the sequence generator 11 is the nth degree, the state value S1 and the delayed vector S5 are composed of n components.

The delayed vector S5 generated by the delayed vector generator 27 is different according to the delayed quantity. In a word, the vector multiplication delay circuits 12 to 14 are the same in the basic structure but different in the delayed quantity, and so different in the value of the delayed vector S5.

(2-5) Operation and Effects

In the PN generator 10 of this embodiment, the M sequence code is generated at a four-chip cycle by the sequence generator 11. The values for three chips skipped in the sequence generator 11 are sequentially generated in the vector multiplication delay circuits 12 to 14 by vector multiplication based on the state value S1 of the sequence generator 11. Thus generated first PN output PN1 to fourth PN output PN4 are combined in the PN generator 10; the successive PN code is obtained. Thereby, the PN generator 10 can reduce its operating rate to a quarter that typical of prior art; operating voltage is reduced, and the electric power consumption is reduced.

In the case where the additional "0" inserted at the end of the cycle of the M sequence code is generated as a PN code, the end portion of the cycle cannot be simply obtained by vector multiplication; however, in the PN generator 10 of this embodiment, the third PN output PN3 is output as the fourth PN output PN4 at the end portion by ensuring that the end portion is the same as the one before. Thereby, also the end portion of the cycle which cannot be simply obtained by vector multiplication, can be easily obtained with a simple structure.

According to the above structure, the M sequence code is generated at a four-chip cycle by the sequence generator 11, and the skipped portion in the sequence generator 11 is obtained by vector multiplication by the vector multiplication delay circuits 12 to 14, so that the operating rate of the PN generator 10 can be reduced to a quarter that typical of prior art; the operating voltage of the circuit can be reduced, and the electric power consumption lowered as a whole.

(3) Second Embodiment (3-1) General Configuration

Figure 7:
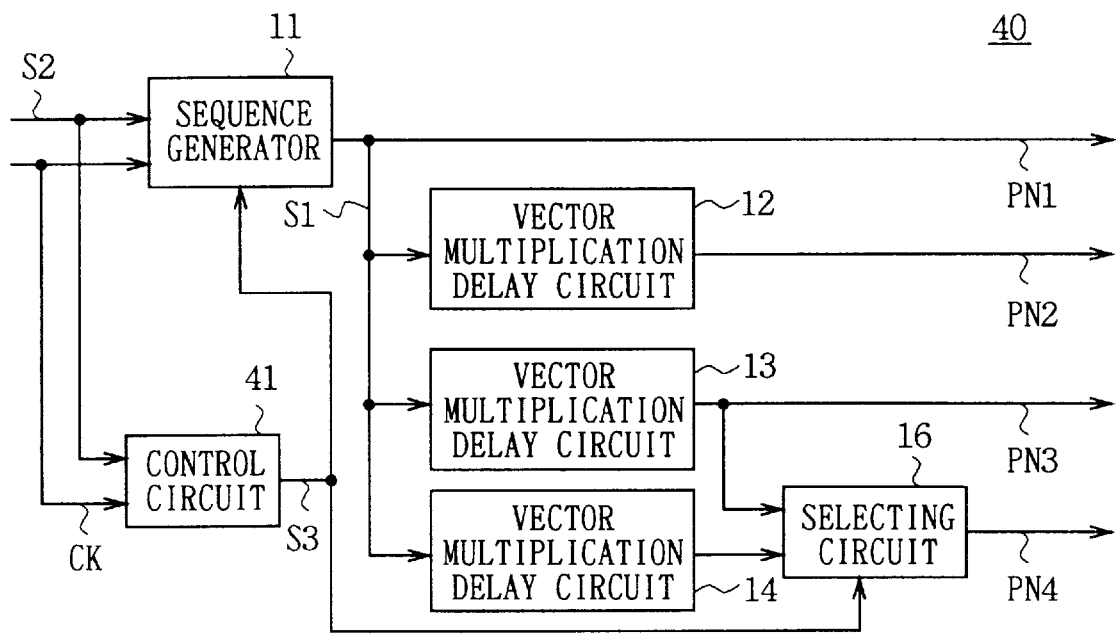
FIG. 7 is a block diagram showing the general configuration of the PN generator according to the second embodiment.

In FIG. 7 wherein portions corresponding to FIG. 2 have the same reference numeral as FIG. 2, reference numeral 40 generally shows the PN generator according to the second embodiment. The PN generator 40 generates a PN code at a quarter operating rate compared to the prior art.

Also in this embodiment, a sequence generator 11 sequentially generates a fifteenth-degree M sequence code at four-chip cycle on the basis of a clock signal CK. In the sequence generator 11, the state value of the register at the final stage is output as a first PN output PN1 in the state value S1 of each register, and the state value S1 of each register is output to vector multiplication delay circuits 12 to 14.

The vector multiplication delay circuits 12 to 14 multiply a state vector obtained from the state value S1 by a delayed vector generated in an internal delayed vector generator, so as to generate the portion skipped in the sequence generator 11. More specifically, the vector multiplication delay circuit 12 obtains the value of the chip which is the next to the M sequence code generated in the sequence generator 11 and outputs it as a second PN output PN2. The vector multiplication delay circuit 13 obtains the value of the chip two chips behind and outputs it as a third PN output PN3. The vector multiplication delay circuit 14 obtains the value of the chip three chips behind and outputs it as a fourth PN output PN4.

However, also in this embodiment, the third PN output PN3 is output as the fourth PN output PN4 by the selecting circuit 16 in the final state of the sequence generator 11. Because the generated PN code has an additional "0" inserted at the end of the cycle of the M sequence code as described in the above first embodiment, the portion cannot be simply obtained by vector multiplication.

In the first embodiment, the control circuit 15 detects the final state of the sequence generator 11 which periodically changes by monitoring the state value S1 output from the sequence generator 11. When detecting the final state, the control circuit 15 outputs the sequence end signal S3 to the selecting circuit 16 to signify the final state, and outputs the sequence end signal S3 to the sequence generator 11 to initialize the sequence generator 11.

However, in the second embodiment, the control circuit 41 detects the final state by counting the clock signal CK supplied to the sequence generator 11. When detecting the final state, the control circuit 41 outputs the sequence end signal S3 to the selecting circuit 16 to signify the final state, and also outputs the sequence end signal S3 to the sequence generator 11 for initialization.

That is, the control circuit 41 has a counter which is initialized by the initializing signal S2 simultaneously with the sequence generator 11, and counts the clock signal CK by the counter to detect the final state. When detecting the final state, the control circuit 41 outputs the sequence end signal S3 to the selecting circuit 16 to signify the final state and initializes the sequence generator 11.

The operation of the PN generator 40 will be described hereinafter with reference to the timing chart shown in FIGS. 8A to 8H. As shown in FIGS. 8A, 8B, and 8E, the sequence generator 11 generates M sequence codes [M(1), M(5), . . . ] at a four-chip cycle on the basis of the clock signal CK, and outputs them as first PN output PN1. Then, if the final state is detected by the counter of the control circuit 41, as shown in FIGS. 8B, 8C, and 8D, the sequence generator 11 is initialized and returned to the initial state, and sequentially generates M sequence codes [M(1), M(5), . . . ] again.

On the other hand, the vector multiplication delay circuits 12 to 14 output values, delayed for one chip, delayed for two chips, and delayed for three chips, with respect to the first PN output PN1, respectively, by vector multiplication based on the state value S1 output from the sequence generator 11. More specifically, as shown in FIG. 8F, the vector multiplication delay circuit 12 generates the values [M(2), M(6), . . . ] of the chip which is the next to the M sequence code generated in the sequence generator 11, and outputs them as second PN output PN2. The vector multiplication delay circuit 13 generates the values [M(3), M(7), . . . ] of the chip two chips behind the M sequence code generated in the sequence generator 11, and outputs them as third PN output PN3, as shown in FIG. 8G. The vector multiplication delay circuit 14 generates the values [M(4), M(8), . . . ] of the chip three chips behind the M sequence code generated in the sequence generator 11, and outputs them as fourth PN output PN4, as shown in FIG. 8H.

However, in the final state, the value [M(4N−1)] of the third PN output PN3 is output as the fourth PN output PN4 by the selecting circuit 16, because the generated PN code which has an additional "0" inserted at the end of the cycle of the fifteenth-degree M sequence code is a code sequence having $2^{15}$ cycle, so that the added portion cannot be easily obtained by vector multiplication. Thereby, in this embodiment, an output just before (i.e., the third PN output PN3) is output as the fourth PN code PN4, so that the sequence generator can be accomplished with a simple structure. By combining thus generated first PN output PN1 to fourth PN output PN4, a successive PN code can be obtained. A successive PN code is obtained in the concrete, by sequentially switching among the first PN output PN1 to the fourth PN output PN4 of the clock of four times the clock signal CK.

(3-2) Structure of Control Circuit

Figure 9:
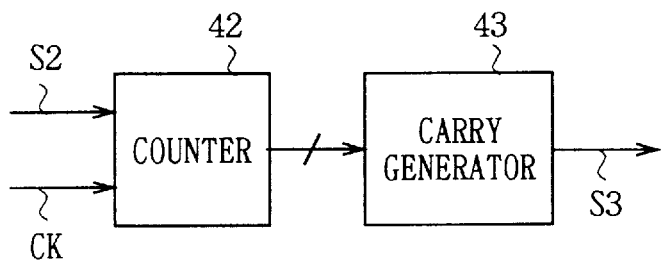
FIG. 9 is a block diagram showing the structure of the control circuit according to the second embodiment.

The control circuit 41 will be described with respect to FIG. 9. As shown in FIG. 9, the control circuit 41 is composed of a counter 42 and a carry generator 43. The counter 42 is initialized by the initializing signal S2 simultaneously with the sequence generator 11 and starts counting up. In this case, the cycle of the counter 42 is set to a value, subtracting N (N=4 because it is a four-chip cycle in this embodiment) from the cycle of the generated PN code.

When the value of the counter 42 has become the final value (i.e., the maximum value), the carry generator 43 detects it and outputs a sequence end signal S3. In this case, becoming the final value in the counter 42 means that the sequence generator 11 is the final state.

This sequence end signal S3 is output to the selecting circuit 16 for the purpose of balancing with the fourth PN output PN4, and also output to the sequence generator 11 for initialization.

In this connection, the control circuit 41 has been described; however, descriptions of the other portions, for example, the sequence generator 11, vector multiplication delay circuits 12 to 14, or the like are omitted since they are same as the first embodiment.

(3-3) Operation and Effects

In the PN generator 40 of this embodiment, first an M sequence code is generated at a four-chip cycle by the sequence generator 11. The values for three chips, skipped in the sequence generator 11, are sequentially generated by vector multiplication based on the state value S1 of the sequence generator 11 in the vector multiplication delay circuits 12 to 14. In the PN generator 40, thus generated first to fourth PN outputs PN1 to PN4 are combined to obtain a successive PN code. Therefore, in the PN generator 40, the operating rate can be reduced to a quarter that of the prior art; the operating voltage of the circuit can be reduced, and the electric power consumption reduced.

Also in the PN generator 40 of this embodiment, the clock signal CK becoming the operating clock of the sequence generator 11 is counted to detect the final state of the sequence generator 11. Also in this case, the final state of the sequence generator 11 can be detected. This it enables the fourth PN output PN4 in the final state to balance.

According to the above structure, an M sequence code is generated at a four-chip cycle by the sequence generator 11, and the portion that has been skipped in the sequence generator 11 is obtained by vector multiplication by the vector multiplication delay circuits 12 to 14, so that the operating rate of the PN generator 40 can be reduced compared with that of the prior art; the operating voltage of the circuit can be reduced, and the electric power consumption reduced as a whole.

(4) Other Embodiments

Figure 10:
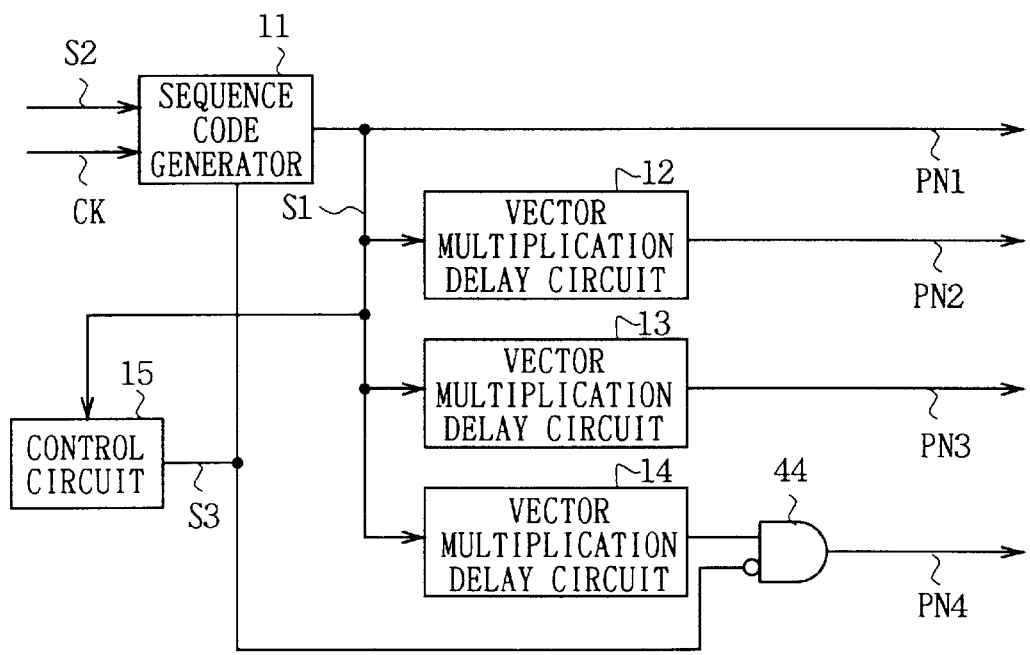
FIG. 10 is a block diagram showing the configuration of the PN generator according to another embodiment.

In the aforementioned embodiments, the third PN output PN3 is output as the fourth PN output PN4 in the final state to balance the fourth PN output PN4; however, the present invention is not limited to that case but also may be compulsory output "0" by means of a gate, or the like, to balance the fourth PN output PN4. For instance, in the first embodiment, as shown in FIG. 10, "0" may be compulsory output as the fourth PN output PN4 when the sequence end signal S3 has been output, by means of the AND gate 44 instead of the selecting circuit 16. Thereby, it enables the structure to be further simplified.

Also in the aforementioned embodiments, an additional "0" is inserted at the end of the cycle of the M sequence code as a PN code, however, the present invention is not limited to that case but also includes the case where an M sequence code is simply generated as a PN code, and the case where a sequence has an additional "1" inserted at the end of the cycle of the M sequence code; the operating rate can be reduced as in the above-mentioned cases.

Further in the aforementioned embodiments, it has been described in the case where the sequence generator 11 generates the M sequence code at a four-chip cycle, however, the present invention is not limited to the case but also includes the case where the sequence generator 11 may generate an M sequence code at other cycles. For instance, in the case where the sequence generator 11 generates an M sequence code at an N-chip cycle, the operating rate can be reduced to 1/N.

As described above, the present invention comprises: a sequence generating means for sequentially generating a maximum length linear code sequence at an N-chip cycle; and the first to the (N−1)th vector multiplying means for obtaining the values of portions has been skipped in the sequence generating means by vector multiplication, on the basis of the state value of a register forming the sequence generating means, and generates a successive pseudo random noise sequence code based on the output of the sequence generating means and the outputs of the first to the (N−1)th vector multiplying means. Thereby, the operating rate can be reduced to 1/N as compared to the prior art; the operating voltage can be reduced, and the electric power consumption lowered.

(5) Further Embodiment

Figure 11:
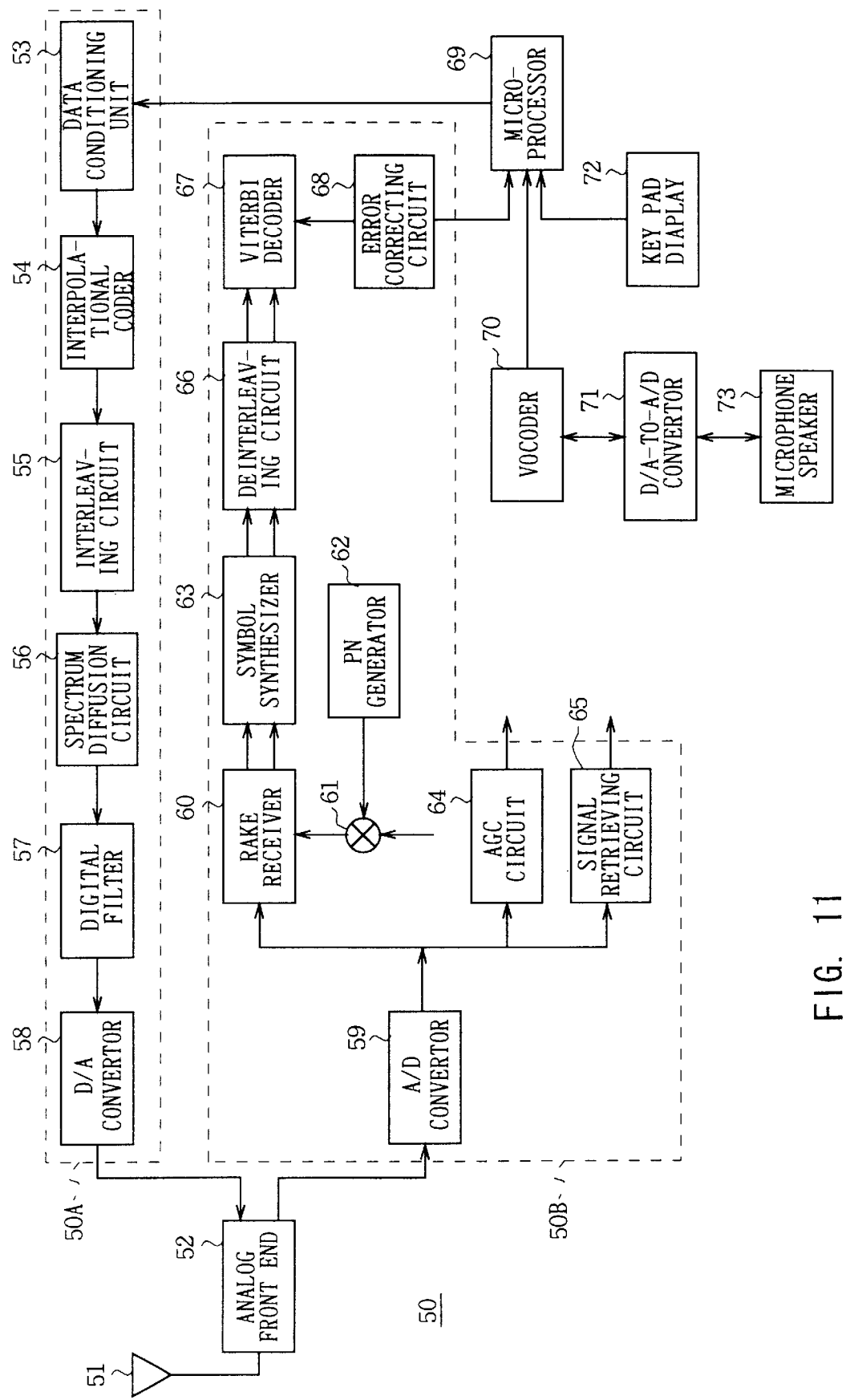
FIG. 11 is a block diagram showing an embodiment of a CDMA receiver/transmitter of the present invention.

FIG. 11 shows a block diagram of the CDMA receiver/transmitter 50 applying the present invention.

An antenna 51 propagates and catches electric waves. An analog front end 52 separates signals into a transmission signal and a reception signal so as not to interfere with each other.

The transmitting unit 50A is composed of a data conditioning unit 53, an interpolational coder 54, an interleaving circuit 55, a spectrum diffusion circuit 56, a digital filter 57, and a digital-to-analog (D/A) convertor 58. In transmission, the data conditioning unit 53 first signal-processes digital data should be transmitted in preparation for the coding. Then the interpolational coder 54 generates an interpolated code. The interpolated code is interleaved by the interleaving circuit 55. The spectrum diffusion circuit 56 performs spectrum diffusion modulation with respect to the interleaved signal. The digital filter 57 eliminates an unnecessary band component from the diffused signal. Thus diffused and filtered signal is converted to an analog signal suitable for transmission by the D/A convertor 58.

The receiving unit 50B is composed of an analog-to-digital (A/D) convertor 59, a rake receiver 60, a multiplier 61, a PN generator 62, a symbol synthesizer 63, an AGC circuit 64, a signal retrieving circuit 65, a deinterleaving circuit 66, a viterbi decoder 67, and an error correcting circuit 68. The A/D convertor 59 first converts a received analog signal to a digital signal. The digital signal is supplied to the rake receiver 60.

Figure 12:
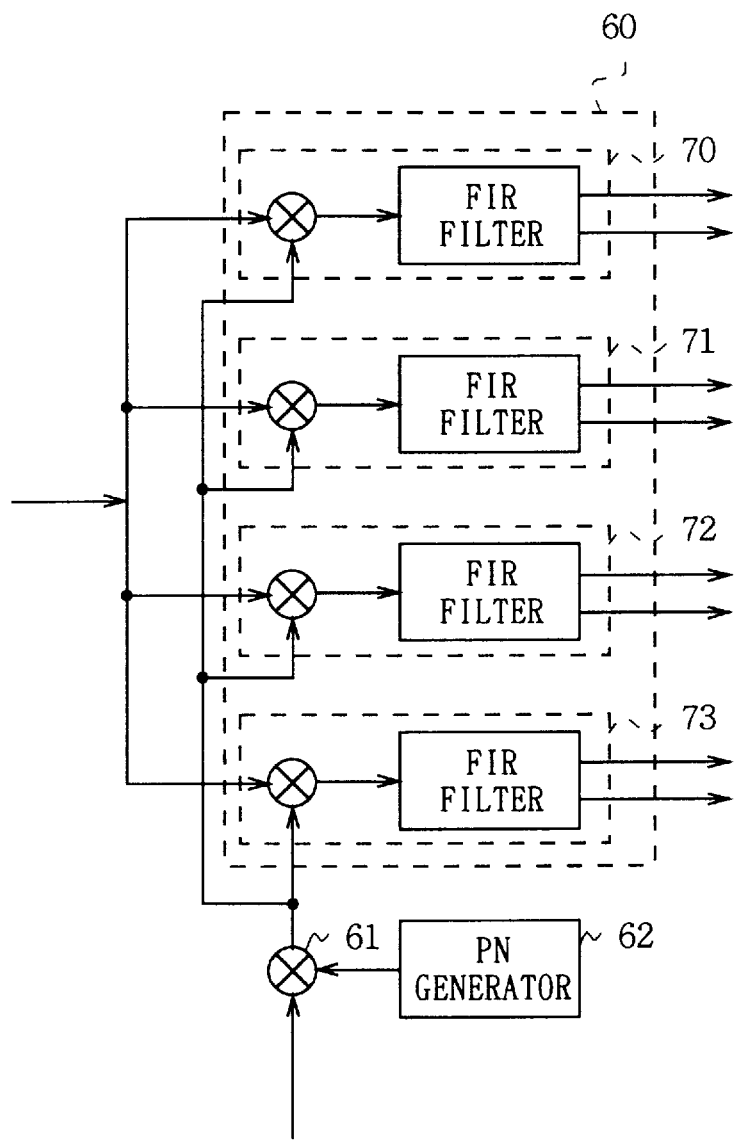
FIG. 12 is a block diagram showing an embodiment of the rake receiver of FIG. 11.

On the other hand, a PN code obtained from the PN generator 62 is multiplied by a carrier wave by the multiplier 61 and supplied to the rake receiver 60. Here the PN generator of the present invention is utilized as the PN generator 62. Note that, it is assumed that the rake receiver 60 has four finger circuits 70 to 73 in this embodiment, as shown in FIG. 12. Each finger circuit is composed of a multiplier and an FIR filter. The finger circuits 70 to 73 multiply the input digital signal by the PN code supplied from the PN generator 62 and demodulate it, and then output the demodulated data to the symbol synthesizer 63 together with timing information, respectively. As described the above, plural finger circuits each of which has a different timing from each other are provided in the rake receiver 60 so that an a multipath effect can be avoided.

The symbol synthesizer 63 synthesizes thus demodulated signals output from the rake receiver 60 with matching timing with each other in accordance with the timing information. The AGC circuit 64 generates a signal for the gain of the receiving circuits and control of transmission power. The signal retrieving circuit 65 is used to control transmission power. The deinterleaving circuit 66 restores the received signal which has been interleaved before transmitted. The viterbi decoder 67 decodes an interpolated code in the signal. Then the error correcting circuit 68 corrects a transmission error on the basis of an error correcting code. A microprocessor 69 controls the operation of the whole receiver and performs conversion processing of received digital data and transmitting digital data. A vocoder 70 performs coding and decoding of a sound signal. A digital-to-analog/analog-to-digital convertor 71 converts a transmitted sound signal to a digital signal and also converts a received sound signal to an analog signal. A key pad display 72 is used for operation by a user or display to offer the user information. A microphone speaker 73 performs conversion between a sound signal and an electric signal which are propagated in the space.

In the transmitter/receiver of the CDMA method, the PN generator 62 described the above can be utilized. The electric power consumption of the PN generator can be reduced according to the present invention, and thus the electric power consumption of the whole apparatus can be reduced, thereby, minimizing and reducing of the weight of the apparatus. Supplying such an advantageous structure would have a beneficial effect on the development of the industry.

While the preferred embodiments of the invention has been disclosed it will be clear to those skilled in the art that various changes and modifications may be made. The appended claims an intended to cover changes and modifications as fall within the true spirit and scope of the invention.

What is claim is:

1. A pseudo random noise generator comprising:
   sequence generating means for generating a maximum length linear sequence code at an N-chip cycle; and
   plural (1 to N−1) vector multiplying means for generating a code not generated by said sequence generating means.

2. The pseudo random noise generator according to claim 1 further including:
   control means for detecting the end of said sequence code and generating a control signal; and
   code inserting means responsive to the control signal for inserting a predetermined code at the end of said sequence code.

3. The pseudo random noise generator according to claim 2 wherein
   said control means comprises a comparator.

4. The pseudo random noise generator according to claim 2 wherein
   said control means comprises a counter.

5. The pseudo random noise generator according to claim 2 wherein said code inserting means comprises
  selecting means for selecting an output signal of one of said plural (1 to N−1) vector multiplying means.

6. The pseudo random noise generator according to claim 2 wherein
said code inserting means comprises
  gate means for selecting an output signal of one of said plural (1 to N−1) vector multiplying means and an output signal of said control means.

7. A pseudo random noise generating method comprising:
a sequence generating step for generating a maximum length linear sequence code at an N-chip cycle; and
plural (1 to N−1) vector multiplying steps for generating a code not generated by said sequence generating means.

8. A receiver for receiving a CDMA signal comprising:
RF signal processing means for processing a received RF signal;
de-spread means for de-spreading the received CDMA signal;
a pseudo random noise generator for generating a PN code and comprising:
  sequence generating means for generating a maximum length linear sequence code at an N-chip cycle, and
  plural (1 to N−1) vector multiplying means for generating a code not generated by said sequence generating means;
decoding means for decoding a convolutional code and producing a decoded signal; and
base band signal processing means for processing the decoded signal.

9. The receiver according to claim 8 wherein said pseudo random noise generator further includes:
control means for detecting the end of said sequence code and generating a control signal; and
code inserting means responsive to said control signal for inserting a predetermined code at the end of said sequence code.

10. A communication apparatus for receiving and transmitting a CDMA signal comprising:
an antenna;
RF signal processing means for processing a received RF signal;
de-spread means for de-spreading the received CDMA signal;
a pseudo random noise generator for generating PN code and comprising:
  sequence generating means for generating a maximum length linear sequence code at an N-chip cycle, and
  plural (1 to N−1) vector multiplying means for generating a code not generated by said sequence generating means;
decoding means for decoding a convolutional code and producing a decoded signal;
base band signal processing means for processing the decoded signal;
coding means for coding the convolutional code and producing an output signal; and
spread means for spreading the output signal of said coding means to generate a CDMA signal.

11. The communication apparatus according to claim 10 wherein
said pseudo random noise generator further includes:
  control means for detecting the end of said sequence and generating a control signal; and
  code inserting means responsive to said control signal for inserting a predetermined code at the end of said sequence code.

* * * * *